(12) United States Patent
Goh

(10) Patent No.: US 10,407,068 B2
(45) Date of Patent: Sep. 10, 2019

(54) SYSTEM AND METHOD OF CONTROLLING AUTOMATIC VEHICLE HOLD

(71) Applicant: Hyundai Motor Company, Seoul (KR)

(72) Inventor: Sang Bum Goh, Suwon-si (KR)

(73) Assignee: Hyundai Motor Company, Seoul (KR)

(\*) Notice: Subject to any disclaimer, the term of this patent is extended or adjusted under 35 U.S.C. 154(b) by 235 days.

(21) Appl. No.: 15/427,974

(22) Filed: Feb. 8, 2017

(65) Prior Publication Data
US 2018/0141556 A1 May 24, 2018

(30) Foreign Application Priority Data

Nov. 22, 2016 (KR) .................. 10-2016-0155435

(51) Int. Cl.
| | |
|---|---|
| B60W 30/18 | (2012.01) |
| B60W 10/06 | (2006.01) |
| B60W 10/08 | (2006.01) |
| B60W 10/188 | (2012.01) |
| B60W 50/14 | (2012.01) |
| B60W 50/08 | (2012.01) |
| B60W 10/04 | (2006.01) |
| B60W 10/18 | (2012.01) |

(52) U.S. Cl.
CPC ...... *B60W 30/18118* (2013.01); *B60W 10/04* (2013.01); *B60W 10/06* (2013.01); *B60W 10/08* (2013.01); *B60W 10/18* (2013.01); *B60W 10/188* (2013.01); *B60W 30/18027* (2013.01); *B60W 50/082* (2013.01); *B60W 50/14* (2013.01); *B60W 2050/143* (2013.01); *B60W 2510/1005* (2013.01); *B60W 2510/182* (2013.01); *B60W 2540/10* (2013.01); *B60W 2540/12* (2013.01); *B60W 2550/142* (2013.01); *B60W 2550/20* (2013.01); *B60W 2710/0666* (2013.01); *B60W 2710/083* (2013.01); *B60W 2710/182* (2013.01)

(58) Field of Classification Search
CPC ....... B60W 30/18118; B60W 30/18027; F16H 2312/04
See application file for complete search history.

(56) References Cited

U.S. PATENT DOCUMENTS

| | | | | |
|---|---|---|---|---|
| 6,330,508 | B1 * | 12/2001 | Akabori | B60K 31/0008 340/903 |
| 2002/0084693 | A1 * | 7/2002 | Isono | B60T 8/4081 303/113.1 |
| 2004/0226768 | A1 * | 11/2004 | DeLuca | B60T 7/042 180/275 |
| 2006/0229771 | A1 * | 10/2006 | Messner | B60T 7/12 701/1 |

(Continued)

FOREIGN PATENT DOCUMENTS

WO WO-2017017764 A1 * 2/2017 ............... B60T 8/17

*Primary Examiner* — Tisha D Lewis
(74) *Attorney, Agent, or Firm* — Slater Matsil, LLP

(57) ABSTRACT

A method of releasing an Automatic Vehicle Hold (AVH) function of an automotive vehicle equipped with a pedal simulator is provided. During operation of the AVH function, either a first mode for releasing the AVH function by an increase of torque of a power train by depressing the accelerator pedal or a second mode for releasing the AVH function by an increase of torque of the power train by depressing the brake pedal again is selected according to driving conditions.

20 Claims, 3 Drawing Sheets

(56) References Cited

U.S. PATENT DOCUMENTS

| | | | | |
|---|---|---|---|---|
| 2014/0350806 A1* | 11/2014 | Koike | ............... | B60W 10/184 |
| | | | | 701/53 |
| 2015/0321675 A1* | 11/2015 | Park | ............... | B60W 10/08 |
| | | | | 701/53 |
| 2017/0114891 A1* | 4/2017 | Yoon | ............... | F16H 61/20 |
| 2018/0126964 A1* | 5/2018 | Korte | ............... | B60T 7/12 |
| 2018/0201241 A1* | 7/2018 | Takae | ............... | B60T 8/17 |

* cited by examiner

SYSTEM AND METHOD OF CONTROLLING AUTOMATIC VEHICLE HOLD

CROSS-REFERENCE TO RELATED APPLICATIONS

This application claims under 35 U.S.C. § 119(a) the benefit of priority to Korean Patent Application No. 10-2016-0155435 filed on Nov. 22, 2016, the entire contents of which are incorporated herein by reference.

TECHNICAL FIELD

The present disclosure relates to a system and method of controlling an Automatic Vehicle Hold (AVH) function of an automotive vehicle.

BACKGROUND

There is inconvenience in that a driver must continue to depress a brake pedal in a situation such as a long-time stopping state, a signal waiting state, etc. during driving of a vehicle and hence the driver's fatigue can be increased.

In order to solve such inconvenience, the AVH is applied to a vehicle.

The AVH is one of driver's convenience devices, which can maintain a stop state even when the driver releases a brake pedal after the driver depresses the brake pedal and hence the vehicle is stopped at D/R/N stage.

When the driver depresses an accelerator pedal at D/R stage after the vehicle is stopped by the AVH, the AVH function is released and the vehicle starts.

At this time, when the AVH function is released by the accelerator pedal, release of the AVH function is performed after the amount of depression of the accelerator pedal and the generation of torque on a power train side are checked in consideration of roll-back on a steep road.

For reference, the power train means that in a case of a hybrid vehicle, it comprises an engine, a motor and a transmission, whereas in a case of a typical internal combustion engine vehicle, it comprises an engine and a transmission.

However, during releasing the AVH function, a feeling of being caught occurs (i.e., feeling that the vehicle starts sluggishly) and feeling of rushing (i.e., feeling that the vehicle starts suddenly) due to external factors such as distribution of friction force between frictional materials and disks of a brake system and torque fluctuation of the power train. This is because it is difficult to precisely match the time point at which torque of the power train is generated by means of the accelerator pedal and driving force is increased with the time point at which braking force is extinguished.

If there is a means capable of releasing hydraulic pressure of the brake without raising torque of the power train under the condition of running on a flat road or a downward inclined road, it is possible to select a manner of releasing the AVH according to the driver's intention, thereby preventing the above-mentioned phenomena such as feeling of being caught, feeling of rushing, etc.

That is, if there is another means for releasing braking force resulting from operation of the AVH by a separate means after maintaining creep torque in addition to the means for allowing the AVH function to be released when the acceleration pedal is depressed and the torque of the power train is raised, it is possible to prevent the above-mentioned phenomena such as feeling of being caught, feeling of rushing, etc.

The above information disclosed in this Background section is only for enhancement of understanding of the background of the invention and therefore it may contain information that does not form the prior art that is already known in this country to a person of ordinary skill in the art.

SUMMARY

The present disclosure relates to a method of releasing an Automatic Vehicle Hold (AVH) function of an automotive vehicle, and more particularly to a method of releasing the AVH function of an automotive vehicle, which allows a driver to select a mode for releasing the AVH function according to driving conditions.

Embodiments of the present invention provide a method of releasing an Automatic Vehicle Hold (AVH) function of a vehicle equipped with a pedal simulator, wherein in addition to a first mode for releasing the AVH function by an increase in torque of a power train by depressing an accelerator pedal, a second mode for allowing the AVH function to be released when a brake pedal is depressed again is implemented such that a driver can select either the first mode or the second mode according to driving conditions.

In one aspect, the present disclosure provides a method of releasing an Automatic Vehicle Hold (AVH) function of a vehicle wherein during operation of the AVH, either one of a first mode for releasing the AVH function by an increase in torque of a power train by depressing an accelerator pedal or a second mode for releasing the AVH function by an increase in torque of a power train by depressing a brake pedal again is selected by a driver according to driving conditions.

In a preferred embodiment, the second mode comprises steps of: i) sensing a stroke value S of the brake pedal by a pedal stroke sensor when the brake pedal is depressed to release operation of the AVH; ii) comparing the stroke value S with a threshold value A by a brake controller and if the stroke value S is greater than the threshold value A, entering a mode for releasing the AVH; iii) requesting, from the brake controller, torque output for driving the vehicle that is equal to or less than creep torque to an engine controller or a motor controller; iv) releasing braking hydraulic pressure provided to a wheel cylinder by the brake controller when the driver releases the driver's foot from the brake pedal; and (v) controlling the engine torque to be output at an amount equal to or less than the creep torque by the engine controller, or controlling motor torque to be output at an amount equal to or less than the creep torque by the motor controller so that the vehicle is launched.

In another preferred embodiment, after step ii) and before step iii), the brake controller receives signal of inclination of the current road from a G sensor 34 and if it is determined that the road is an upward inclined road at D stage or a downward inclined road at R stage, entry into the mode for releasing the AVH is interrupted.

Further, after step ii) and before step iii), the brake controller receives signal of inclination of the current road from a G sensor 34 and, if it is determined that the road is an upward inclined road at D stage or a downward inclined road at R stage, release of the AVH by the first mode is induced by utilizing a visual or an audible alarm.

Further, after step ii) and before step iii), the brake controller controls a simulator valve to be closed and then controls the simulator valve to be opened after a predetermined time B so that the driver can perceive feeling of operation of releasing the AVH from the brake pedal.

In addition, in order to prepare for a situation that the driver cannot perceive feeling the operation of releasing the AVH from the brake pedal, a step of notifying the driver by means of a visual or audible alarm that the AVH is being released is further performed.

With the above-mentioned means for solving the problems of the prior art, the present invention provides the following effects.

According to the present invention, release of the AVH is implemented by not only a first mode for releasing the AVH function by means of torque of a power train to be raised by depressing an accelerator pedal but also a second mode for allowing the AVH function to be released when a brake pedal is depressed again so that a driver can select either the first mode or the second mode according to driving conditions, thereby enhancing driver's convenience in using the AVH function.

Other aspects and preferred embodiments of the invention are discussed infra.

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g. fuels derived from resources other than petroleum). As referred to herein, a hybrid vehicle is a vehicle that has two or more sources of power, for example both gasoline-powered and electric-powered vehicles.

The above and other features of the invention are discussed infra.

BRIEF DESCRIPTION OF THE DRAWINGS

The above and other features of the present invention will now be described in detail with reference to certain exemplary embodiments thereof illustrated the accompanying drawings which are given hereinbelow by way of illustration only, and thus are not limitative of the present invention, and wherein.

Figure 1:
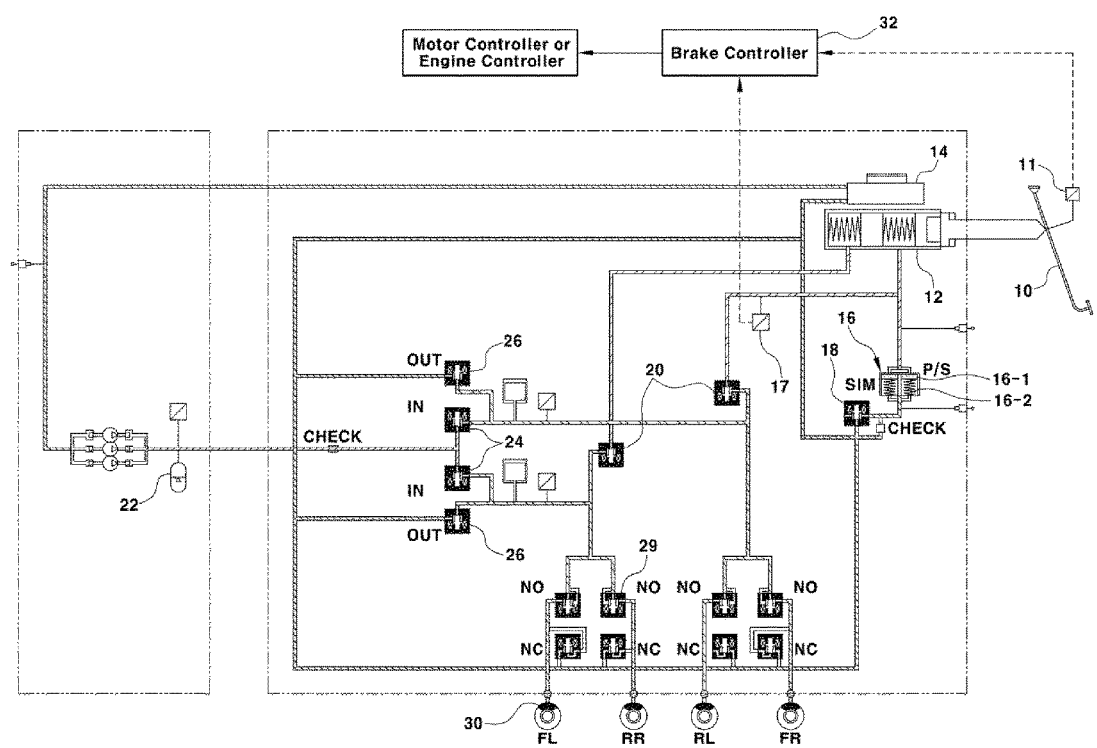
FIG. 1 is a brake circuit diagram of a vehicle equipped with a pedal simulator for implementing a method of releasing an AVH function according to the present invention.

It should be understood that the appended drawings are not necessarily to scale, presenting a somewhat simplified representation of various preferred features illustrative of the basic principles of the invention. The specific design features of the present invention as disclosed herein, including, for example, specific dimensions, orientations, locations, and shapes will be determined in part by the particular intended application and use environment.

In the figures, reference numbers refer to the same or equivalent parts of the present invention throughout the several figures of the drawing.

DETAILED DESCRIPTION OF ILLUSTRATIVE EMBODIMENTS

Preferred embodiments of the present invention will be described below in more detail with reference to the accompanying drawings.

First, in order to facilitate understanding of the present invention, the principle of operation of AVH of a vehicle equipped with a pedal simulator will be described below.

Environmentally friendly vehicles (e.g., electric vehicles, hybrid vehicles, etc.) in which braking by a hydraulic brake and braking by motor regenerative braking are controlled cooperatively is equipped with a brake pedal simulator. Further, typical internal combustion engine vehicles are also equipped with the brake pedal simulator in order to adjust feeling of depression force and repulsion force of a brake pedal to a desired level.

That is, a hydraulic pressure control unit of a wheel brake for exerting actual braking force and a pedal simulator unit for realizing the brake pedal feeling are separated from each other.

FIG. 1 shows a brake circuit diagram of a vehicle equipped with a pedal simulator.

As can be seen in FIG. 1, a master cylinder 12 for delivering brake hydraulic fluid in a reservoir 14 is connected to a brake pedal 10.

The pedal simulator unit for realizing the brake pedal feeling comprises a pedal simulator 16 connected to a hydraulic pressure discharge line of the master cylinder 12, a simulator valve 18 connected to an outlet side of the pedal simulator 16, and a cut valve 20 connected to the hydraulic pressure discharge line of the master cylinder 12 to cut off hydraulic pressure transmitted to each wheel during operation of the AVH.

A pedal stroke sensor 11 is mounted at the brake pedal 10 and a pedal simulator pressure sensor 17 is mounted in the hydraulic pressure discharge line of the master cylinder 12.

On the other hand, a hydraulic pressure control unit of a wheel brake for exerting actual braking force comprises a high-pressure accumulator 22 for regulating the hydraulic fluid in the reservoir 14 to a high pressure and an in-valve 24 and an out-valve 26 which are connected to an outlet side of the high-pressure accumulator 22.

In this case, outlets of an in-valve 24 and an out-valve 26 are connected to a wheel cylinder 30 mounted on each wheel of the vehicle. Reference numeral 29 denotes a wheel valve that operates only under certain conditions such as ABS control of each wheel.

Hereinafter, operational process of the AVH will be described on a basis of configuration of a brake circuit of the vehicle equipped with the pedal simulator.

In an initial state when the brake pedal is not depressed during running of the vehicle, a predetermined high hydraulic pressure (brake pressure) is accumulated (stored) in the high-pressure accumulator 22 and other valves do not work.

On the other hand, when the driver depresses the brake pedal 10 during running of the vehicle, the pedal stroke sensor 11 installed at the brake pedal 10 detects a brake pedal stroke (i.e., depression amount of the brake pedal depressed by the driver) and transmits the detected signal to a brake controller 32, and then the brake controller 32 calculates braking force required by the driver based on the brake pedal stroke.

Subsequently, the cut valve 20 is closed and the simulator valve 18 is opened by control of the brake controller 32, while amount of opening and closing of the in-valve 24 and the out-valve 26 is controlled by current control.

Accordingly, as the cut valve 20 is closed, the pedal simulator unit connected to the master cylinder side and the hydraulic pressure control unit of the wheel brake for exerting the actual braking force are shut off from each other.

At this time, hydraulic pressure from the master cylinder 12 is supplied to the pedal simulator 16 and at the same time the simulator valve 18 is operated to be opened, with the result that a piston 16-1 in the pedal simulator 16 moves while compressing a spring 16-2 and thereby reaction force of the spring 16-2 increases and acts towards the brake pedal side, so that the driver feels the reaction force (i.e., feeling of pedal operation) in response to depression of the brake pedal.

Further, hydraulic pressure from the high-pressure accumulator 22 passes through the in-valve 24 and is provided to the wheel cylinder 30 mounted on each wheel of the vehicle, whereby braking of the vehicle is started and if the vehicle speed approaches zero due to continuous braking under the AVH ready condition, the vehicle enters the AVH hold mode in which the AVH function is exerted.

In this way, the inlet valve 24 and the outlet valve 26 besides the cut valve 20 are controlled to be closed after entry into the AVH hold mode and hence the hydraulic pressure provided to the wheel cylinder 30 does not leak, so that the AVH function in which braking force is maintained even when the foot is released from the brake pedal is exerted.

Figure 2:
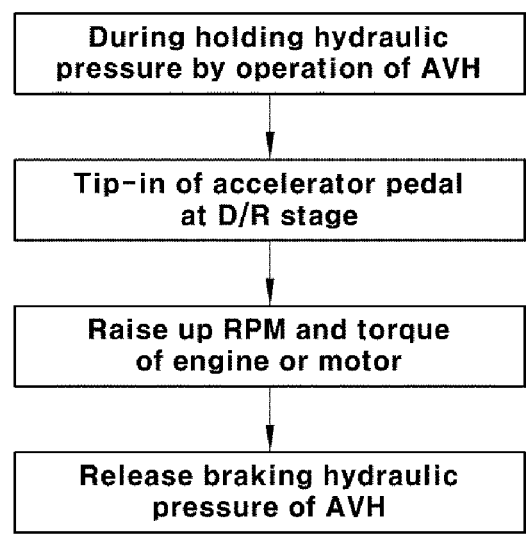
FIG. 2 is a flowchart showing a first mode for releasing the AVH function.

On the other hand, the first mode for releasing the AVH function (i.e., conventional mode) includes a tip-in step that an accelerator pedal is depressed to start the vehicle at D stage or R stage; a step of raising RPM and torque of a motor or an engine; and a step of releasing braking hydraulic pressure of the AVH, as shown in FIG. 2.

Particularly, release of the AVH function, i.e., release of braking hydraulic pressure of the AVH is performed when the out-valve 26 is opened at the time point when the RPM and torque of the motor or the engine becomes equal to or more than a certain level and as a result the braking hydraulic pressure provided to the wheel cylinder 30 is removed, thereby enabling launch of the vehicle.

That is, the braking hydraulic pressure provided to the wheel cylinder 30 is released through the out-valve 26, whereby the braking state of the vehicle is released and at the same time the vehicle can be launched.

However, in the first mode for releasing the AVH function, there is occurred feeling of being caught (i.e., feeling that the vehicle starts sluggishly) and feeling of rushing (i.e., feeling that the vehicle starts suddenly) due to external factors such as distribution of friction force between frictional materials and disks of a brake system and torque fluctuation of the power train. This is because it is difficult to precisely match the time point at which driving force of the vehicle is increased by means of generation of torque of the power train with the time point at which braking force is extinguished.

As discussed above, the principal point of the present invention is that release of the AVH is implemented by not only a first mode for releasing the AVH function by means of torque of a power train to be raised by depressing an accelerator pedal but also a second mode for allowing the AVH function to be released when a brake pedal is depressed again so that the driver can select either the first mode or the second mode according to driving conditions, thereby preventing occurrence of the feeling of being caught and the feeling of rushing at the time of releasing the AVH function.

Hereinafter, the second mode for releasing the AVH function that is carried out by depressing the brake pedal again will be described with reference to FIGS. 1 and 3.

Figure 3:
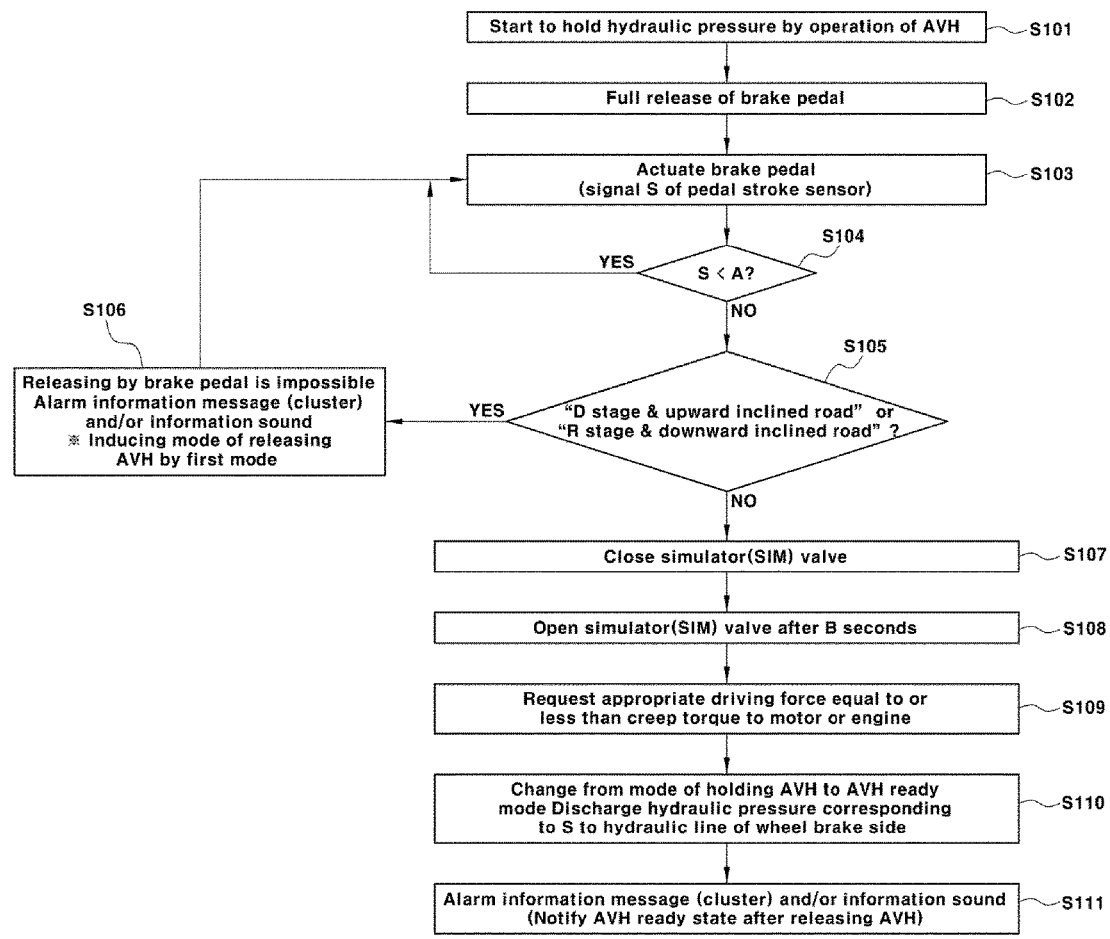
FIG. 3 is a flowchart showing a second mode for releasing the AVH function.

FIG. 3 is a flowchart showing the second mode for releasing the AVH function of the vehicle, according to the present invention.

During operation of the AVH in which the AVH function is performed as described above, a full release state of the brake pedal under which the driver releases his/her foot from the brake pedal is maintained in steps S101 to S102.

In this state, the driver depresses the brake pedal to release the operation of the AVH, that is, to release the braking hydraulic pressure in response to the operation of the AVH.

Subsequently, as the brake pedal 10 is depressed, the pedal stroke sensor 11 detects the brake pedal stroke and transmits the sensed stroke value S to the brake controller 32 in step S103.

Next, the brake controller 32 compares the stroke value S from the pedal stroke sensor 11 with the threshold value A at step S104 and if the stroke value S is larger than the threshold value A, enters a mode for releasing the AVH.

Of course, if the stroke value S is smaller than the threshold value A, entry into the mode for releasing the AVH is not performed.

As an example, the threshold value A is determined as a stroke value corresponding to the current braking hydraulic pressure of the AVH in a map data (a map of target braking hydraulic pressure for strokes of a brake pedal) stored in the brake controller.

Further, the brake controller 32 receives signal of inclination of the current road from the gravity (G) sensor 34 and if it is determined that the road is an upward inclined road while the vehicle is at drive (D) stage or a downward inclined road while the vehicle is at reverse (R) stage at step S105,entry into the mode for releasing the AVH by the second mode in which the brake pedal is required to be depressed is not performed because a safety accident may be caused due to roll-back of the vehicle and the driver may instinctively depress the accelerator pedal when starting on the upward inclined road.

Preferably, if it is determined that the road is an upward road while the vehicle is at D stage or the road is a downward inclined road while the vehicle is at R stage, release of the AVH by the first mode in which the acceleration pedal is required to be depressed is induced by utilizing a visual (e.g., information message) or an audible (e.g., information sound) alarm at step 106.

In this case, when the pedal stroke sensor 11 detects the brake pedal stroke and transmits it to the brake controller 32 in step S103, the brake controller 32 controls the simulator valve 18 to be closed in step S107 and then controls the simulator valve 18 to be opened after a predetermined time B in step S108, so that the driver can perceive the feeling of operation of releasing the AVH from the brake pedal.

More specifically, when the brake controller 32 controls the simulator valve 18 to close, the piston 16-1 in the pedal simulator 16 is not moved so that the brake pedal does not advance, while when the simulator valve 18 is controlled to be opened after the predetermined time B, the piston 16-1 in the pedal simulator 16 is moved such that the brake pedal advances, so that it is possible for the driver to perceive the feeling of operation of releasing the AVH from the brake pedal (i.e., feeling at the time when the brake pedal advances again after the advance of the brake pedal is interrupted instantaneously).

The predetermined time (B) may be set to, for example, 0.5 seconds during which the driver can perceive the feeling of operation of releasing the AVH.

Next, the brake controller 32 transmits signal requesting torque output for driving the vehicle, which is equal to or less than creep torque, to an engine controller (in a case of an internal combustion engine vehicle) or a motor controller (in a case of an environmentally friendly vehicle) in step S109.

In this case, when the brake controller 32 transmits the signal requesting torque output for driving the vehicle, which is equal to or less than the creep torque, to the engine controller or the motor controller, the AVH is switched to a ready mode but the driver continues to depress the brake pedal to release the AVH function. Therefore, the braking hydraulic pressure corresponding to the stroke value S is supplied from the high-pressure accumulator 22 to the wheel cylinder 30 mounted on each wheel of the vehicle through the in-valve 24 and thus, the braking state of the vehicle is maintained in step S110.

Subsequently, when the driver releases his/her foot from the brake pedal, the brake controller 32 controls the braking hydraulic pressure supplied to the wheel cylinder 30 to be released so that the vehicle is launched.

More specifically, when the driver releases his/her foot from the brake pedal, the brake controller 32 controls the outlet valve 26 to be opened in order to release the braking hydraulic pressure and thus the braking hydraulic pressure provided to the wheel cylinder 30 passes through the outlet valve 26 so that the braking hydraulic pressure of the AVH is released, and then the engine controller controls the engine torque to be equal to or less than the creep torque, or the motor controller controls the engine torque to be equal to or less than the creep torque, with the result that the vehicle is launched.

Preferably, in order to prepare for a situation that the driver cannot perceive the feeling of operation of releasing the AVH from the brake pedal, a step of notifying the driver by means of a visual or audible alarm that the AVH is being released is performed in step S111.

Hereinafter, an example of selecting the mode of releasing the AVH function as the first mode or the second mode depending on the driving situation will be described.

Gear Shift Stage Placed at D Stage & Smooth Traffic Condition (Release of the AVH in a First Mode is Selected)

If the preceding vehicle starts quickly when the foot is taken off the brake pedal (state of full release of the brake pedal) in response to entry into a mode of holding the AVH, the first mode is selected to start quickly, although the feeling of being caught and the feeling of rushing as mentioned above may occur.

Therefore, when the driver depresses the accelerator pedal, the braking hydraulic pressure is released and at the same time torque and RPM of the power train are increased so that the vehicle can start quickly.

Driving on a Flat Road & Gear Shift Stage Placed at D Stage & Severe Traffic Congestion (Release of the AVH in a Second Mode is Selected)

If the preceding vehicle starts slowly when the foot is taken off the brake pedal (state of full release of the brake pedal) in response to entry into a mode of holding the AVH, the second mode is selected.

Therefore, even if the braking hydraulic pressure is released and at the same time torque and RPM of the power train are increased and thereby creep torque is applied to the wheel when the driver depresses the brake pedal, the driver can start the vehicle slowly while controlling the brake pedal.

Further, the feeling of being caught and the feeling of rushing as mentioned above can be minimized by controlling the initial torque applied to the wheel to be equal to or less than the creep torque.

Driving on a Downward Inclined Road & Gear Shift Stage Placed at D Stage & Severe Traffic Congestion (Release of the AVH in a Second Mode is Selected)

If the preceding vehicle starts slowly on a downward inclined road in severe stationary traffic situation when the foot is taken off the brake pedal (state of full release of the brake pedal) in response to entry into a mode of holding the AVH, the second mode is selected.

Therefore, even if the braking hydraulic pressure is released and at the same time torque and RPM of the power train are increased and thereby creep torque is applied to the wheel when the driver depresses the brake pedal, the driver can start the vehicle slowly while controlling the brake pedal. Furthermore, it is possible to secure safe driving through controlling of the brake since the vehicle runs on the downward inclined road in severe stationary traffic situation.

Driving on an upward inclined road & Gear shift stage placed at D stage & Severe traffic congestion (Release of the AVH in a first mode is selected)

If the preceding vehicle starts slowly on an upward inclined road in severe stationary traffic situation when the foot is taken off the brake pedal (state of full release of the brake pedal) in response to entry into a mode of holding the AVH, the first mode is selected.

Therefore, when the driver depresses the accelerator pedal, the braking hydraulic pressure is released and at the same time torque and RPM of the power train are increased so that the vehicle can start slowly without roll-back in line with the preceding vehicle.

In this way, release of the AVH is implemented by not only a first mode for releasing the AVH function by means of torque of a power train to be raised by depressing an accelerator pedal but also a second mode for allowing the AVH function to be released when a brake pedal is depressed again so that a driver can select either the first mode or the second mode according to driving conditions, thereby enhancing driver's convenience in using the AVH function.

The invention has been described in detail with reference to preferred embodiments thereof. However, it will be appreciated by those skilled in the art that changes may be made in these embodiments without departing from the principles and spirit of the invention, the scope of which is defined in the appended claims and their equivalents.

What is claimed is:

1. A method of releasing an Automatic Vehicle Hold (AVH) function of a vehicle, the method comprising:
   at a first time, operating the vehicle in a first mode of operation of the AVH, the first mode for releasing the AVH function by an increase of torque of a power train by depressing an accelerator pedal; and
   at a second time, operating the vehicle in a second mode operation of the AVH, the second mode for releasing the AVH function by an increase of torque of a power train by depressing a brake pedal, the first or second mode being selected according to driving conditions, wherein the second mode is selected when a speed shift stage is placed at D (drive) stage while the vehicle runs on a flat road or when a speed shift stage is placed at D stage while the vehicle runs on a downward inclined road.

2. The method of claim 1, wherein the first or second mode is selected by a driver of the vehicle.

3. The method of claim 2, further comprising notifying the driver using a visual or audible alarm that the AVH is being released.

4. The method of claim 1, wherein the second mode comprises:
   sensing a stroke value of the brake pedal by a pedal stroke sensor when the brake pedal is depressed to release operation of the AVH;

comparing the stroke value with a threshold value by a brake controller and when the stroke value is greater than the threshold value, entering a mode for releasing the AVH;

requesting, from the brake controller, a torque output for driving the vehicle that is equal to or less than creep torque to an engine controller or a motor controller;

releasing braking hydraulic pressure provided to a wheel cylinder by the brake controller when a driver takes off the driver's foot from the brake pedal; and controlling engine torque to be output at an amount equal to or less than the creep torque by the engine controller, or controlling motor torque to be output at an amount equal to or less than the creep torque by the motor controller so that the vehicle is launched.

5. The method of claim 4, wherein the threshold value is determined as a stroke value corresponding to current braking hydraulic pressure of the AVH in a map data set stored in the brake controller.

6. The method of claim 4, wherein after entering the mode for releasing the AVH and before requesting the torque output, the brake controller receives a signal of inclination of a current road from a gravity (G) sensor and when it is determined that the current road is an upward inclined road at D stage or a downward inclined road at R (reverse) stage, entry into the mode for releasing the AVH is interrupted.

7. The method of claim 6, wherein after entering the mode for releasing the AVH and before requesting the torque output, the brake controller receives a signal of inclination of a current road from the G sensor and when it is determined that the current road is an upward inclined road at D stage or a downward inclined road at R stage, release of the AVH by the first mode is induced by utilizing a visual or an audible alarm.

8. The method of claim 4, wherein after entering the mode for releasing the AVH and before requesting the torque output, the brake controller controls a simulator valve to be closed and then controls the simulator valve to be opened after a predetermined time so that the driver can perceive feeling of operation of releasing the AVH from the brake pedal.

9. The method of claim 8, wherein the predetermined time is set to 0.5 seconds during which the driver perceives feeling of operation of releasing the AVH.

10. The method of claim 1, wherein release of the AVH in the first mode is selected when a speed shift stage is placed at D stage and traffic condition is smooth.

11. The method of claim 1, wherein release of the AVH in the second mode is selected when a speed shift stage is placed at D stage while the vehicle runs on a flat road and traffic congestion is severe.

12. The method of claim 1, wherein release of the AVH in the second mode is selected when a speed shift stage is placed at D stage while the vehicle runs on a downward inclined road and traffic congestion is severe.

13. The method of claim 1, wherein release of the AVH in the first mode is selected when a speed shift stage is placed at D stage while the vehicle runs on an upward inclined road and traffic congestion is severe.

14. A method of releasing an Automatic Vehicle Hold (AVH) function of a vehicle, the method comprising:

sensing a stroke value of a brake pedal by a pedal stroke sensor when the brake pedal is depressed to release operation of the AVH;

comparing the stroke value with a threshold value by a brake controller;

determining that the stroke value is greater than the threshold value;

entering a mode for releasing the AVH;

requesting, from the brake controller, a torque output for driving the vehicle that is equal to or less than creep torque to an engine controller or a motor controller;

releasing braking hydraulic pressure provided to a wheel cylinder by the brake controller when a driver takes off the driver's foot from the brake pedal; and controlling engine torque to be output at an amount equal to or less than the creep torque by the engine controller, or controlling motor torque to be output at an amount equal to or less than the creep torque by the motor controller so that the vehicle is launched.

15. The method of claim 14, wherein after entering the mode for releasing the AVH and before requesting the torque output, the brake controller receives a signal of inclination of a current road from a gravity sensor and when it is determined that the current road is an upward inclined road at D (drive) stage or a downward inclined road at R (reverse) stage, entry into the mode for releasing the AVH is interrupted.

16. The method of claim 14, wherein after entering the mode for releasing the AVH and before requesting the torque output, the brake controller controls a simulator valve to be closed and then controls the simulator valve to be opened after a predetermined time so that the driver can perceive feeling of operation of releasing the AVH from the brake pedal.

17. A vehicle comprising:

a power train;

an accelerator pedal;

a brake pedal; and a pedal simulator configured to implement a method of releasing an Automatic Vehicle Hold (AVH) function of a vehicle, wherein during operation of the AVH function, either a first mode for releasing the AVH function by an increase of torque of a power train by depressing the accelerator pedal or a second mode for releasing the AVH function by an increase of torque of the power train by depressing the brake pedal again is selected according to driving conditions, wherein release of the AVH in the second mode is selected when a speed shift stage is placed at D (drive) stage while the vehicle runs on a flat road or when a speed shift stage is placed at D stage while the vehicle runs on a downward inclined road.

18. The vehicle of claim 17, wherein release of the AVH in the first mode is selected when a speed shift stage is placed at D stage and traffic condition is smooth.

19. The vehicle of claim 17, wherein release of the AVH in the second mode is selected when a speed shift stage is placed at D stage while the vehicle runs on a flat road and traffic congestion is severe or when a speed shift stage is placed at D stage while the vehicle runs on a downward inclined road and traffic congestion is severe.

20. The vehicle of claim 17, wherein release of the AVH in the first mode is selected when a speed shift stage is placed at D stage while the vehicle runs on an upward inclined road and traffic congestion is severe.

* * * * *